United States Patent [19]

O'Donnell

[11] 4,057,392

[45] Nov. 8, 1977

[54] APPARATUS FOR TREATING SEWAGE SLUDGE

[75] Inventor: James M. O'Donnell, Slatersville, R.I.

[73] Assignee: Orgonics, Inc., Slatersville, R.I.

[21] Appl. No.: 665,118

[22] Filed: Mar. 8, 1976

Related U.S. Application Data

[60] Division of Ser. No. 472,714, May 23, 1974, Pat. No. 3,942,970, which is a continuation-in-part of Ser. No. 196,765, Nov. 8, 1971, abandoned.

[51] Int. Cl.² .............................................. C05F 3/06
[52] U.S. Cl. ..................................... 23/259.1; 71/28; 71/64 DA; 210/152; 210/197
[58] Field of Search .................... 23/259.1; 71/28, 29, 71/64 C, 64 DA; 241/189 A, 190; 210/10, 152, 195 R, 177

[56] References Cited

U.S. PATENT DOCUMENTS

| 1,977,644 | 10/1934 | Paxton ................................. 23/259.1 |
| 2,976,126 | 3/1961 | Seymour ........................ 71/64 D X |
| 2,977,214 | 3/1961 | McLellan ........................... 23/259.1 |
| 3,873,734 | 3/1975 | Higgins et al. ..................... 71/29 X |

*Primary Examiner*—Frank A. Spear, Jr.
*Assistant Examiner*—Ferris H. Lander
*Attorney, Agent, or Firm*—Richard P. Crowley

[57] ABSTRACT

An apparatus for and a process of treating sludge filter cake and the granular product thereof which comprises reducing the particle size and moisture content of the sludge cake, sterilizing the sludge cake by contacting the sludge cake with an N-methylol-urea solution, reacting the N-methylol-urea solution with the sludge cake at a pH of 3 to 5 while agitating the sludge particles to provide a granular-reaction product, and drying the product to provide a granular, high-nitrogen, odorless fertilizer or animal feed supplement product.

8 Claims, 4 Drawing Figures

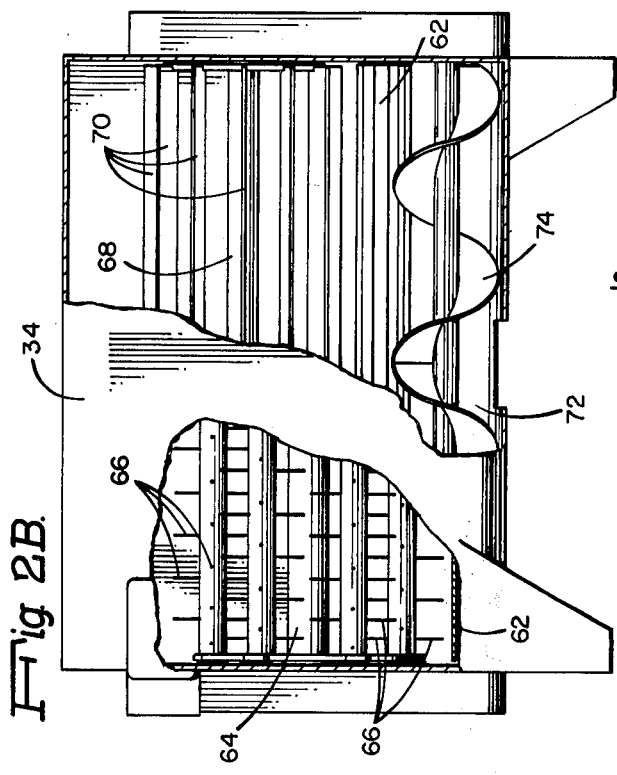
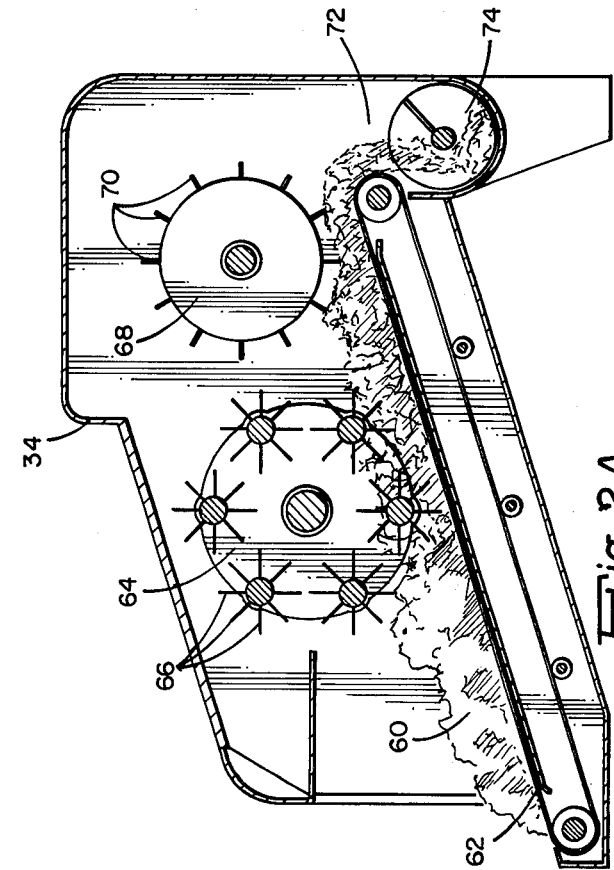
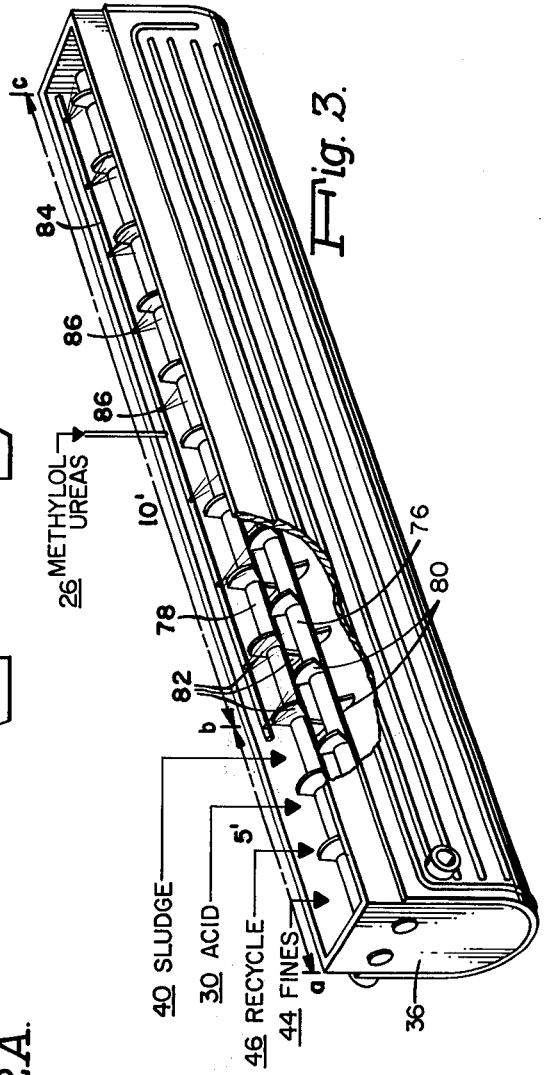

APPARATUS FOR TREATING SEWAGE SLUDGE

REFERENCE TO PRIOR APPLICATION

This is a division of application Ser. No. 472,714, filed May 23, 1974, now U.S. Pat. No. 3,942,970 issued Mar. 9, 1976 which application is a continuation-in-part of Ser. No. 196,765, filed Nov. 8, 1971 (now abandoned).

BACKGROUND OF THE INVENTION

In recent years, there has been increasing insistance on the part of federal and local governments for minicipalities and industries to pretreat their used water and remove all pollutant and contaminants before recycling the water to the hydrogeological environment. As more used water-treatment plants come into existence and as their efficiency for removing dilatorious matter improves, a secondary problem of major proportions develops, which relates to the ultimate disposal of the solid material precipated from the used water-treatment plant.

The solid materials collected from such treatment facilities have potential as a valuable recyclable natural resource; however, its collected form is not marketable. Until the turn of the mid century, natural organic materials (now called waste products) accounted for a substantial portion of the fertilizer nitrogen supply, while today, such materials supply less than 1% of the total market. The reason is that modern-day fertilizers are high in fertilizer nitrogen, granular and are odor-free, while natural organic materials are often low in nitrogen, are dusty and often given to odor problems.

Solid material collected from waste water-treatment plants is normally referred to as sewage sludge, and in its final form, is a filter cake containing between about 12 to 50% solids, with the balance water.

In a standard waste water treatment, sewage influent enters a primary sedimentation or precipitation tank where the bulk of the solids is collected and transferred to a digestor for action upon by an anaerobic bacteria for a period of from one to three months, depending on the environmental conditions set up in the digestor. A by-product of the digestor is methane gas which can be recovered and may be used as a source of energy.

The resulting digested sludge (containing about 92 to 95% water) is normally sent to a dewatering process where the moisture is reduced to between about 70 and 50%. In some cases, biological sludges will contain as much as 88% moisture and only 12% solids after dewatering. Various methods have been used for this dewatering process, such as: centrifuging, vacuum filter wheels and sand filter beds. All these methods have certain advantages which may designate their use in a particular area. However, they all have one common problem: a wet filter-cake material which has no utilitarian value in its present physical form, and an infectious disease problem.

In order to enhance and to fortify the fertilizer value of fertilizer sludge and various other carriers, urea and formaldehyde have been incorporated therein by various techniques and under difficult conditions (see, for example, U.S. Pat. Nos. 3,073,693; 3,226,318; 3,231,363; and 3,655,395). However, these processes do not relate to techniques for directly converting sludge filter cake into a sterilized, granular, high nitrogen, dust-free product suitable for use as a fertilizer or an animal feed supplement product.

SUMMARY OF THE INVENTION

My invention relates to a system for and a process of treating sludge materials and to the product produced thereby. In particular, my invention concerns a system for and process of producing from waste filter-cake sludge material a granular, high-nitrogen, odorless fertilizer as an animal feed supplement product. My invention is an improvement and extension of the invention disclosed in my copending application Ser. No. 196,765, the disclosure of which is incorporated herein in this application. In my prior application, I have described a process which included the sterilization of pathogenic sewage material with N-methylol urea to provide a deodorizing effect on the product. My present invention is an improvement and includes as an optional, but preferred, part thereof the use of a sterilizing step in the process.

In the present invention, I provide an apparatus and process for producing, on a continuous and economical basis, a granular, high-nitrogen, odorless fertilizer, animal feed supplement or similar product by the reaction of methylol urea with sterilized, partially dried, shredded, sludge cake material.

I have discovered that acid-condensable, prepolymer solutions which contain a methylol monomer which sterilizes the sludge material may be reacted with the sludge material while being condensed, or polymerized under such conditions to produce a solid compound of such moisture content as to produce granulation of the solid particles. The resulting granular product under such process conditions is particularly useful as a fertilizer or animal feed supplement.

The sludge material useful in the practice of my invention comprises the pathogenic sludge filter-cake material from treatment plants, such as industrial or domestic sewage sludge.

The preferred components of my process are domestic sewage sludge, commercially available urea (45 to 46% N) and formaldehyde (37%); however, substitutions can be made without altering the essence of the invention. For example, an industrial waste sludge may replace domestic sewage sludge. Typical types of sludge cakes that I have used are activated sludge from cellulose and paper plants, tobacco waste sludges, animal waste sludge from cattle, sheep, hogs and chickens, while satisfactory results have also been obtained using raw or undigested minicipal sewage filter cakes.

In the practice of my invention, the condensable methylol-urea solutions are preferred as prepared by the reaction of urea and formaldehyde to form a prepolymer N-methylol-urea solution, and the reaction of such solution with the sludge within a particular time period after the reaction, so as to provide a product with controlled decomposition or dissolution characteristics. Typically, the prepolymer solution contains a mixture of mono and di N-methylol urea.

While commercially available urea containing 45 to 46% nitrogen is the preferred reactant, it may be replaced by casein, melamine, phenol, or the water-soluble polymeric constituents thereof. Concentrated solutions of urea can be used with a corresponding increase in the concentration of formaldehyde. In place of formaldehyde (37%), so called "urea-formaldehyde concentrates" can be used. These commercially available products usually contain about 60% formaldehyde, 25% urea and 15% moisture. In addition, other aldehydes, such as para-formaldehyde, crotenaldehyde, acetaldehyde, propionaldehyde and/or formaldehyde-generating agents, can be used.

It has been found that a hydrogen ion is required to convert the HCOH to methylene ($CH_2$) groups in the resulting polymer linkage in the polymerization step. It is usually necessary to add this ion in the form of a strong mineral acid, such as sulfuric, hydrochloric or phosphoric acid, but organic acids, such as acetic, formic, or lactic acid or mixtures thereof, may be used.

Another and preferred way of controlling hydrogen-ion-concentration is to add an ammonium-acid salt to the solid materials prior to the addition of the prepolymer methylol-urea solution. Again a choice of such salts are available, such as ammonium nitrate, sulfate, borate, chloride or others. However, the preferred salts would be ammonium sulfate, phosphate (mono or its dibasic), since any of these will enhance the fertilizer value of the end product.

The use of ammonium salts to control pH has the dual effect of supplying sufficient hydrogen ion for the reactions and forming hexamethylene tetramine which greatly enhances the stability of the resulting polymer once formed. Using ammonium sulfate as a typical example, the reaction would be:

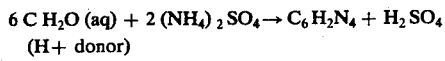
(H+ donor)

In previously described procedures for adding urea-formaldehyde to sewage sludge or other carriers, pH control during polymerization has typically been maintained between one and three for the best results. The resulting mixtures were then neutralized in order to prevent cross-polymerization of the polymer.

I have found that, for the purpose of my process, the pH of the reactants in the polymerization step should be maintained at between 3.0 and 5.0, and preferably between 4.0 and 4.5. The maintaining of such pH limits makes it unnecessary to neutralize the end product; thus, avoiding an additional step and the use of a neutralizer.

The physical and chemical natures of the prepolymers to be added to the sludge cake material are important, and are as follows:

1. They must be in a soluble or dispersed form so that they can be easily sprayed or sparged into the sludge.
2. They must be easily polymerizable at relatively low temperatures; e.g., 40° to 70° C, and high pH's (4.0 to 4.5).
3. After polymerization, they must have the appearance of solids and have a solids-to-moisture ratio considerably higher than the sludge being treated. For example, if the solids-to-water ratio in the sludge cake is between 1 to 3 and 1 to 1, the solids ratio of the polymerizable material must be at least 3 to 2.
4. The resulting polymers must be of relatively low molecular weight; for example, not greater than 300, and preferably essentially a straight-chain polymer not withstanding the possibility of co, branch or graft-type polymerization with the constituents or the sludge. In any case, the number of $CH_2$ groups should not exceed 5, and preferably is 3 to 4, and a $CH_2$ radical should not be present as a terminal group.

In general, I have found that the best method of preparing a prepolymer with the above properties is described in my copending patent application Ser. No. 196,765, for example, wherein 1 part of commercially available 37% formaldehyde is neutralized with triethanolamine to a pH of 8.0, and to this mixture is added 1 part of commercially available prilled urea containing 46% nitrogen. A negative heat of solution ensues which will lower the temperature to 5° C. The solution is then gently heated to 30° C, at which point the urea is in solution with the formaldehyde. After ten minutes, the temperature of the solution will rise to 60° C, at which point it is considered suitable for reaction with the sludge.

For the purpose of illustration only, my process will be described employing an N-methylol-urea solution as described with a domestic sludge material.

BRIEF DESCRIPTION OF THE DRAWINGS

FIGS. 2A and 2B are partially cut-away and schematic side and end views respectively of a sludge feeder used in my process.

FIG. 3 is a representative perspective, partially cut-away view of a mixing and reaction vessel used in my process.

DESCRIPTION OF THE EMBODIMENTS

Figure 1:
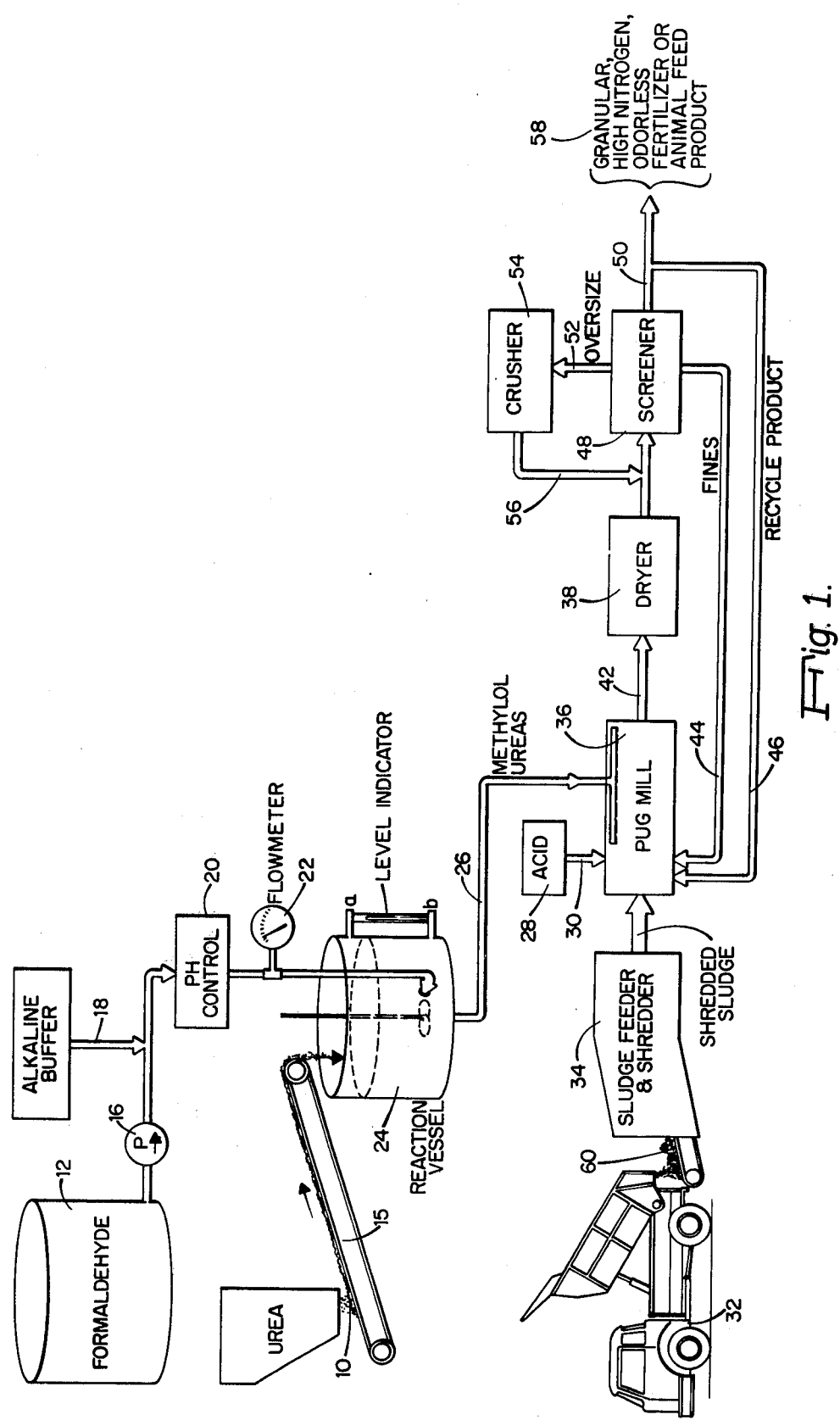
FIG. 1 is a schematic illustration of my process for the continuous production of a granular, high-nitrogen, odorless product.

In my process as shown in FIG. 1, commercially available prilled urea 10 is fed from a source, such as a surge bin, to an adjustable control gate gravimetric feeder onto a continuous conveying belt 15, and is continuously transported to a reaction vessel 24. Simultaneously, commercially available 37% formaldehyde is pumped 16 from a storage vessel 12 through line 14 containing a pH control meter 20 and a flow meter 22 to the reaction vessel 24.

Concurrently, a alkaline buffer solution is proportioned through line 18 into the formaldehyde line 14 in order to maintain an alkaline pH of between 7.0 and 8.5. This pH is continuously monitored by the pH meter 20. The reaction time of the urea formaldehyde, while variable, is important to the ability of the N-methylol solution to react with organic sludge filter cake. I have found that the reactivity of the N-methylol solution with the sludge material cake decreases with an increase in the reaction time under alkaline conditions, i.e., in the prepolymer methylol-urea stage. This discovery is used to control the reaction conditions to provide a product of the desired properties.

In my process, as will be described, all the components are being removed from the reaction vessel 24 at the same rate at which they are being added. Therefore, the residence time in the reactor 24 will determine the degree of methylolization that occurs. The degree of methylolization is regulated by maintaining a fixed level in the reaction vessel 24 between points a and b as illustrated.

There is a direct relationship between the temperature and the reaction time in the reactor 24. Reaction time can vary between ten and thirty minutes, and the temperature between 30° and 80° C. My preferred operating range is for a time of fifteen to twenty minutes, at between 40° and 60° C, which provides a mixture of reactive methylol urea, such as mono and di methylol urea.

Heat is added to the reaction by a steam jacket surrounding the reactor. Heat is generally required to initiate methylolization; however, because of the exothermic nature of the reaction, the reaction is usually self-sustaining thereafter. In order to have complete control of all conditions, the jacket of the reactor is designed so that steam can be replaced with cooling water. The jacket may be replaced by coils or a series of multiple reactors could replace the single reactor, or coils may be used as the reactor, such as in the case with a "plug flow" reactor.

The volume of the reaction vessel 24 should be designed to the overall volume of the prepolymer required in the process. For example, if ten gallons per minute is the anticipated volume of N-methylol compounds to be used in the process, then the reaction vessel should be designed to operate efficiently at 300 and 100 gallons, respectively. Referring to my FIG. 1, point (a) would represent 300 gallons, while point (b) would represent 100 gallons, which would represent a residence time of thirty and ten minutes at the higher and lower levels, respectively.

Sludge material 60 composed of domestic sewage sludge filter cake is typically delivered by a dump truck 32 to a sludge feeder and shredder 34, described more fully in FIG. 2, wherein the sludge filter cake is broken up and reduced in particle size, and the reduced particle size sludge material delivered through 40, such as a screw conveyor, to a mixer 36. The mixer 36 provides for thorough homogeneous mixing and agitation of the sludge material during the sterilization and subsequent polymerization or reaction stages.

As set forth more fully in my copending application, sterilization of the pathogenically contaminated shredded sludge may be carried out by contacting the sludge with a condensable mono or di methylol-aqueous solution under alkaline conditions. Sterilization reduces odor of the sludge and permits its use as fertilizer, and particularly as an animal feed product. Sterilization typically is carried out in the initial or first stage of the mixing operation, while reaction of the sludge with a urea-methylol solution occurs with the addition of an acid to a pH of 3.0 to 5.0 of the sludge material. In addition as illustrated and optionally, fines from the process and recycled dry granular product may be introduced into the mixer 36 preferably during the sterilization step. A preferred mixer is a steam-jacketed pug mill described more fully in FIG. 3.

A strong acid 28, such as a sulfuric acid, is introduced through line 30 into the mixer 36 to initiate reaction of the methylol solution. Fines; i.e., particles of lower than desired size, produced by the process are introduced into the mixer 36 through line 44. Other supplements, such as antioxidants, vitamins, urea, phosphates, fillers, etc., to be incorporated into the product may be introduced into the mixer 36 for homogeneous blending with the sludge particles.

It is desirable to control the reaction temperature and to reduce the moisture content of the sludge in the mixer 36, and, thus, the mixer is steam-cold-water-jacketed for this purpose. In addition, dry particles, such as dry granular products produced by the process, may be introduced into the mixer through line 46 to aid in controlling and reducing the moisture content. The methylol-urea solution is introduced from the reaction vessel 24 through line 26 for sterilization and polymerization within 10 to 30 minutes after preparation.

The reaction product from the mixer 36 is a partially dry granular reaction product composed of particles of sludge which have interreacted with the methylol urea and polymerized methylol urea. Typically, the reaction product is discharged from the mixer at a temperature of 50° to 60° C, with an excess temperature of over 80° C avoided.

The reaction product is then conveyed 42 to a dryer 38 for the reduction of moisture to a desired level, typically less than 10%, and, thereafter, the dry product is introduced into a screener 48 for the classification of the dry particles of the product. Fines from the screener 48 are recycled 44 to the mixer or otherwise used. Oversize particles of the product are sent via 52 to a crusher 54 for size reduction, and are returned via 56 to the screener or classifier. Dry granular, odorless, high-nitrogen product 50 of the desired size is removed, packaged and is ready for use.

Special consideration must be given to the preparation of the sludge filter cake prior to its introduction into the process.

Sludge filter cakes, regardless of their method of preparation, are composed of a heterogenous mass of materials ranging in particle size from a fraction of a cubic inch to often more than a cubic foot. In addition, these particles are apt to be bound together by interlacing cellulosic fibers. Before this material can be reacted with the N-methylol compounds, it should be reduced to a more or less homogenous particle size typically of 1/10th of an inch or less. Both the feeder-shredder and the mixer 36 may be used for this purpose, or the size reduction carried out by only the shredder or by other means.

The feeder 34, illustrated more particularly in FIG. 2, works on the principal of a constantly moving bed of filter cake, moving under rotating and raking cylinders, which, in the case of the highest or last raking cylinders, acts as a bed-leveling wheel or means. As the sludge moves under the rotating raking cylinders, the cake is shredded into small particle sizes. The degree of shredding and particle-size reduction is directly related to the moisture content of the sludge cake and the water-absorbing characteristics of a particular sludge being used. For example, my preferred moisture content for the average digested municipal sludge cake would be between about 40 and 50%, while with a biological sludge or activated sludge, the preferred moisture range would be from about 60 to 80%.

FIGS. 2A and 2B illustrates one embodiment of a feedershredder wherein the sludge cake 60 is deposited on an upwardly moving conveyor belt 62, wherein it passes under a rotating shredding cylinder or reel 64 having a plurality of tines 66 thereon to shred the cake 60, and, subsequently, the shredded bed is passed under a rotating leveling reel 68 also having a plurality of tines 70 which level the particles to the desired depth. The shredded level bed of particles is then directed into a discharge chute 72 wherein the material falls into a screw conveyor 74 for passage into the mixer 36. Excess moisture drains from the sludge during the feeding and shredding operations.

As the sludge material leaves the sludge feeder 34, it has been reduced considerably in particle size. However, in order for these particles to remain in tact and be suitable for granulation, it is necessary to reduce further the moisture content to between about 30 to 50%. This may be accomplished by heat or heat and the adding of dry recycled product; that is, material which has already been through the process, and which now contains about 3 to 7% moisture, to the shredded sludge in the presence of violent mixing. Violent mixing and agitation are provided by a pug mill illustrated in FIG.

3. Fines or undersized material from the process can be used as part of the recycled material. When the sludge has been properly mixed, it will have an average particle size of between about 14 and 20 mesh. The pug mill also serves as the reaction vessel for the N-methylol compounds with the sludge. Since the pH of the sludge is critical to the proper reaction, it may be necessary to acidify the sludge material. If this is the case, acid may be added to the sludge during its mastication process with the recycle. In any event, the pH of the reacted sludge exiting the pug mill should be between 4.0 and 5.0.

In FIG. 3, the pug mill 36 is steam-jacketed and contains two parallel rotating shafts 76 and 78 extending longitudinally the length of the mill, each shaft having a plurality of paddles 80 and 82 thereon to provide for violent mixing, particle reduction and agitation of the particles during the stages of admixing in solid materials and during sterilization and reaction stages. The paddles 80 and 82 typically alternate along the shafts and provide a squeezing and kneading action to the solid material. The sludge material is moved by the opposingly rotating paddles toward the outlet.

As illustrated, the mill 36 has a length of about 15 feet with the first 5 feed designated by $a$–$n$ used for the introduction of fines, recycled dry product, acid and shredded sludge in that order. The alkaline methylol-urea solution is introduced onto the particles through line 26 to longitudinal pipe 84 containing a plurality of spray nozzles 86, wherein the solution is sprayed onto the agitated sludge particles. In the length $b$–$c$ of the mill 36, polymerization and reaction occur as the acidic sludge material reduces the pH of the methylol-urea solution to effect polymerization.

As the reacted sludge material leaves the pug mill 36, it is granular and has a temperature of about 55° to 60° C. The rise in temperature from ambient to 60° C is usually accomplished by the exothermic conditions which accompany the condensation of N-methylol compounds to N-methylene compounds. However, if this reaction is not sufficient to maintain a temperature in the pug mill of 60° C, then additional heat can be added through a steam jacket surrounding the pug mill. At this point in the process, the product is essentially complete and remains only to be dried and properly sized.

Numerous drying options are available for the product at this point; however, my preferred method is to introduce the product from the pug mill 36 to a rotary cocurrent hot-air dryer 38. Care must be taken not to overheat the material during the drying operation. At temperatures above 95° C, further polymerization of the N-methylene compounds is forced, thereby creating highly cross-linked polymers which are not agronomically suitable. For this reason, the temperature of the material is constantly monitored throughout the drying step to insure that it does not exceed 80°C, and is preferably held in the range of 70° to 75° C. The moisture content of the produce following the drying step is between about 3 and 10%, and preferably 5 to 8%.

The dry product is then screened 48 into separate sizes as desired, such as oversize material (+6 mesh), which is sent 52 to a crushing mechanism 54 where the particle size is reduced to such an extent that it passes through a 6-mesh sieve. The material from the second screen (−6 mesh +20 mesh) may be considered finished product 50, and is transferred to storage or bagging area. The material which passes through the second screen (−20 mesh) is considered as fines, and it is returned 44 to the pug mill as previously described as part of the recycled material.

Having thus described my invention in general, I now offer for the purposes of illustration only the following examples.

EXAMPLE 1

7,500 lbs. per hour of a municipal digested sewage filter cake containing 60% moisture and 2% nitrogen, largely in a water-insoluable form (dry basis), were continuously metered from a sludge feeder to a pug mill between points $a$ and $b$ (refer to pug mill detail of FIG. 3), along with sufficient sulfuric acid (66° # - ) 2, to reduce the pH of the cake to 4.0. Concurrently, 4,980 lbs. per hour of a methylol-urea reactant was continuously metered from the chemical reaction tank 24 to the pug mill 36.

The methylol-urea reactant was prepared in the following manner: 2,490 lbs. of urea were continuourly metered from a surge bin to the chemical reaction tank 24. Concurrently, 2,490 lbs. per hour of 37% formaldehyde were metered from a storage tank 12 to the chemical reaction tank 24, while simultaneously being neutralized to a pH of 7.5 with potassium hudroxide 5. The level in the chemical reactor was maintained at a point sufficient to allow a residence time of 20 minutes, or about 1,660 lbs. The temperature of the methylol-urea solution in the reaction vessel was held at 60° C by means of a steam jacket surrounding the tank. This resulting reactant was continuously applied to the moving bed of solids material in the pug mill 36 between points $b$ and $c$.

Along with the sludge cake and acid being added between points $a$ and $b$ of the pug mill 36, a sufficient amount of recycle material (moisture content 5%) was added from the recycle line 46, and fines via line 44 from the screener 48, to result in an overall moisture content in the material leaving the pug mill of about 30%. This required about 3,650 lbs. of fines and 3,650 lbs. of material from the recycle bin.

The overall length of the pug mill employed was 15 feet, the length from $a$ to $b$ 5 feet and from $b$ to $c$ 10 feet. The paddles in the pug mill can be adjusted in order to increase or decrease the residence time of the material in any given section of the pug mill. Thus, for example, the paddles in section $a$ to $b$ are adjusted to a residence time of 10 minutes, and in the $b$ to $c$ section, for an additional ten minutes. The time in the pug mill is adjusted so that when the material flows from the pug mill, the reaction is essentially complete and all methylol ureas have been converted to methylene ureas, which become part of the co- or graft-type polymer with the protein constituent of the sewage.

As the material left the pug mill, it was discharged onto a continuous conveying belt which deposited it into a cocurrent rotary hot-air dryer 38 for a time and at a temperature sufficient to reduce the moisture of the treated sludge to 5%.

As the material left the dryer 38, it was elevated to a screener 48 where it was separated into three particle-size ranges:

12(a) + 6 mesh material (oversize)
12(b) − 6 mesh + 20 mesh material (finished product)
12 (c) − 20 mesh material (fines)

The oversize material was fed to a chain mill crusher 54 and then back to an elevator 56 and to the screener 48. The on-size product is conveyed to a bulk storage area or bagging operation. The fines were recycled 44 back to the pug mill 36.

The finished product from this experiment had the following specifications:

| Chemical Analysis | |
|---|---|
| Moisture | 7% |
| Nitrogen | 20% |
| Water-Insoluble Nitrogen | 14% |
| Activity Index | 50% |

EXAMPLE 2

10,000 lbs. per hour of a biological (activated) sludge filter cake containing 88% moisture and 6.5% nitrogen (dry basis) largely in a water-insoluble form were treated with 1,328 lbs. of methylol-urea solution comprised of 664 lbs. of urea (45% nitrogen) and 664 lbs. of formaldehyde of (37% solution) per hour.

The sludge was a waste by-product of an activated biological treatment process used to treat the used water from a cellulose pulp plant. The methylol-urea solution was prepared in the same manner as outlined in Example 1, with the exception of the quantities of urea and formaldehyde. The sludge was treated in the same manner as outlined in Example 1, with the exception that the amount of recycle (fines plus finished product) was a total of 7,335 lbs. per hour, resulting in a moisture content leaving the pug mill of 50%.

The chemical analysis if the product was as follows:

| Moisture | 5% |
|---|---|

TABLE I

| Hour to Hour | Lbs. of Urea | Lbs. of Formaldehyde | U/F Mole Ratio | Total Nitrogen | Insoluble Nitrogen | Activity Index | Nitrification Index | 3-week Nitrification | Total 15-week Nitrogen Availability |
|---|---|---|---|---|---|---|---|---|---|
| 1 | 2,028.4 | 2,490 | 1.1/1 | 17% | 15.3 | 15 | 3 | 1 | 4 |
| 2 | 2,212.8 | 2,490 | 1.2/1 | 18% | 15.4 | 20 | 10 | 3 | 13 |
| 3 | 2,397.2 | 2,490 | 1.3/1 | 19.5% | 15.6 | 32 | 25 | 5 | 30 |
| 4 | 2,489.0 | 2,490 | 1.35/1 | 20% | 15.0 | 42 | 30 | 15 | 45 |
| 5 | 2,544.72 | 2,490 | 1.39/1 | 20.5% | 15.3 | 48 | 35 | 20 | 55 |
| 6 | 2,581.60 | 2,490 | 1.4/1 | 21% | 14.7 | 50 | 35 | 25 | 60 |
| 7 | 2,766.0 | 2,490 | 1.5/1 | 20.9% | 13.6 | 55 | 39 | 30 | 69 |
| 8 | 3,688.0 | 2,490 | 2/1 | 24% | 12 | 65 | 65 | 30 | 95 |

| Nitrogen | 19% |
|---|---|
| Water-Insoluble Nitrogen | 14.25% |
| Activity Index | 48% |

The reaction involved in the practice of my invention results in relatively short straight-chain methylene-urea polymers. In my process, it is necessary to control the molecular ratio of urea to formaldehyde.

The relationship between total nitrogen, water-insoluble nitrogen, activity index and nitrification index as used herein is as follows:

| Nitrification | The conversion of nitrogen compounds in the soil to nitrate nitrogen by nitra-bacter. |
|---|---|
| Nitrification Index | The percentage of nitrogen converted to nitrate in a 15-week period minus the percentage converted in a 3-week period. |
| Total Nitrification Index | The percentage of nitrogen totally nitrified or converted to nitrate in a 15-week period. |
| Total Nitrogen | The percentage of nitrogen contained in the product. |
| Insoluble Nitrogen | That percentage of the total nitrogen which does not dissolve in cold water. |
| Activity Index | That percentage of insoluble nitrogen which is soluble in a boiling phosphate bufferred solution. |

In order to demonstrate the effect of the urea-to-formaldehyde mole ratio on the above quality indicators, the following experiment was conducted.

7,500 lbs. per hour of the municipal sludge, outlined in Example 1, were treated with a methylol-urea reactant prepared with the following variations from Example 1 on an hour-to-hour basis (Table I).

From a agronomic standpoint, a Nitrification Index of 30–35 and total 15-week nitrogen availability of 50 to 55 are most desirable. This results in a product which will gradually release about 75% of its nitrogen over a six-month growing period. As can be seen from Table I, a urea-to-formaldehyde mole ratio of between 1.35 to 1.38 to 1 would yield such a product. However, there may be special cases where it is desirable to have nitrification proceed for a matter of years rather than months. In these cases, a molecular ratio of 1.1 to 1 or 1.2 to 1 may be more desirable. On the other hand, if the product is to be used as an animal feed supplement, the nitrogen should be released at a more rapid rate and a mole ratio of 2 to 1 would be more desirable. In any case, if the highly cross-linked polymers normally associated with urea-formaldehyde plastics are to be avoided, then the mole ratio must exceed 1.2 to 1. Conversely, if an undue amount of free urea in the end product is to be avoided, then the mole ratio cannot exceed 2 to 1.

What I claim is:
1. An apparatus for the treatment of sludge filter cake material, which comprises in combination:
   a. means to reduce the particle size of the sludge filter cake to be treated which comprises,
      i. a means to move a continuous bed of the sludge filter cake to be reduced,
      ii. a rotating raking reel means to shred the sludge filter cake on the bed into small particles,
      iii. a rotating leveling reel to provide a uniform bed of the shredded sludge material, and
      iv. means to convey the shredded sludge particles to the inlet section of the mixing means;
   b. means to agitate, mix and react the reduced sludge material, which means includes,
      i. a rotating shaft within an elongated vessel,
      ii. the vessel including an inset at the one end of the vessel and an outlet at the other end, and defining a reaction section therein,
      iii. the shaft including a plurality of paddles secured thereto for rotation with the shaft to provide for mixing of the reduced sludge material and movement of the material from the inlet to the outlet, iv. means to introduce the reduced sludge into an inlet section of the vessel, v. means to introduce an acid material into the reduced sludge material in the vessel, vi. means to heat the vessel whereby the reaction section may be maintained at a reaction temperature from about 30° to 80° C, vii. means to introduce recycled dry sludge material into the inlet section of the vessel, viii. means to introduce into the reaction section of the vessel an aqueous condensable methylol-prepolymer solution for reaction with the sludge and for condensation, and ix. means to discharge a granular sludge-polymer reaction product from the outlet;

c. means to dry the discharged reaction product from the outlet to a desired moisture content of less than about 10%; and d. means to screen the dry reaction product and to recover a dry reaction product of the desired particle size.

2. The apparatus of claim 1 wherein the means to introduce the prepolymer solution comprises means to spray the solution onto the moving agitated reduced sludge particles along at least a part of the reaction section of the vessel.

3. The apparatus of claim 1 wherein the means to reduce the sludge filter cake material comprises:

a. a conveyor belt means to receive and move a continuous bed of the sludge filter cake to be reduced on the belt means;

b. a rotating raking reel means above the moving sludge filter cake bed having a plurality of extending tines to shred the sludge filter cake on the bed into small particles;

c. a rotating leveling reel above the moving shredded sludge filter cake bed and after the reel means, and having a plurality of tines to provide a uniform bed depth of the shredded sludge material; and d. means at the other end of the belt to receive the leveled bed and to convey the shredded sludge particles to the inlet section of the mixing means.

4. The apparatus of claim 3 wherein the means to convey the shredded sludge particles includes a screw-type conveyer positioned adjacent the other discharge end of the belt conveyer, and generally parallel to the other end, whereby shredded sludge particles are discharged into and along the length of the screw conveyer adjacent the other end of the conveyer belt and conveyed away generally perpendicularly to the belt movement and to the inlet of the mixing means.

5. The apparatus of claim 3 wherein the rotating raking means includes a reel with a plurality of cylindrical rollers positioned and secured generally to the outer circumference thereof for rotation therewith, each roller containing a plurality of tines extending from the surface of the rollers to shred the sludge filter cake material.

6. The apparatus of claim 1 which includes a means to crush oversized dry product from the screener and to recycle the product to the screener.

7. The apparatus of claim 1 which includes a means to recycle undersized fine particles of the dry product from the screener to the inlet section of the mixing means.

8. The apparatus of claim 1 wherein the means to agitate and mix includes at least first and second parallel and opposingly rotating shafts, each shaft having a plurality of mixing paddles secured thereto along its length, the paddles alternately placed so as to mix and move the sludge material from the inlset to the outlet, and a plurality of spray nozzles extending from the outlet toward the inlet sections and positioned above the mixing and moving sludge material, whereby the methylol-prepolymer solution may be sprayed onto the mixing and moving acid sludge material.

* * * * *